United States Patent
Gutmann et al.

(10) Patent No.: US 8,264,176 B2
(45) Date of Patent: Sep. 11, 2012

(54) FAN ARRANGEMENT

(75) Inventors: Markus Gutmann, March (DE); Arno Karwath, Deisslingen (DE); Thomas Dufner, Schonach (DE)

(73) Assignee: EBM-Papst St. Georgen GmbH & Co. KG., St. Georgen (DE)

( * ) Notice: Subject to any disclaimer, the term of this patent is extended or adjusted under 35 U.S.C. 154(b) by 295 days.

(21) Appl. No.: 12/743,572

(22) PCT Filed: Nov. 17, 2008

(86) PCT No.: PCT/EP2008/009701
§ 371 (c)(1),
(2), (4) Date: Jun. 3, 2010

(87) PCT Pub. No.: WO2009/065539
PCT Pub. Date: May 28, 2009

(65) Prior Publication Data
US 2010/0253249 A1    Oct. 7, 2010

(30) Foreign Application Priority Data
Nov. 19, 2007    (DE) .................... 10 2007 057 099

(51) Int. Cl.
*H02P 11/00* (2006.01)
(52) U.S. Cl. .................. 318/268; 318/257; 318/271
(58) Field of Classification Search .................. 318/257, 318/268, 271
See application file for complete search history.

(56) References Cited

U.S. PATENT DOCUMENTS

| | | | |
|---|---|---|---|
| 5,269,660 A | 12/1993 | Pradelle | 417/18 |
| 5,447,414 A | 9/1995 | Nordby et al. | 417/20 |
| 5,736,823 A | 4/1998 | Nordby et al. | 318/432 |
| 6,368,064 B1 | 4/2002 | Bendikas et al. | 417/2 |
| 6,462,494 B1 | 10/2002 | Schoene et al. | 318/433 |
| 6,967,459 B2 | 11/2005 | Hahn et al. | 318/599 |
| 7,190,137 B2 | 3/2007 | Lelkes | 318/439 |
| 7,244,106 B2 | 7/2007 | Kallman et al. | 417/44.1 |
| 7,917,017 B2 * | 3/2011 | Kanamori | 388/811 |

(Continued)

FOREIGN PATENT DOCUMENTS
DE    44 08 442 A1    9/1995
(Continued)

OTHER PUBLICATIONS
Engineering Toolbox, "Process Controllers" 2005, www.engineeringtoolbox.com.
(Continued)

*Primary Examiner* — Thomas Dougherty
(74) *Attorney, Agent, or Firm* — Mitton Oliver, Esq.; Oliver Intellectual Property LLC

(57) ABSTRACT

A fan arrangement (20) has a fan (24) driven by an electric motor (22), also an apparatus for detecting the electrical power ($P_{IST}$) consumed by the electric motor (22) during operation; an input apparatus (28) for inputting a desired rotation speed ($n_{SOLL}$) of said electric motor (22); a converter (26) for converting said desired rotation speed ($n_{SOLL}$) into a desired electrical power ($P_{SOLL}$); and a controller (44), which regulates the control input controlling the electric motor (22) in such a way that the difference between the electrical power ($P_{IST}$) consumed in operation and the desired electrical power ($P_{SOLL}$) is reduced, in order thereby to improve the air output characteristic curve (49, 58) of the fan arrangement (20) at least in a portion of the overall operating range.

6 Claims, 6 Drawing Sheets

U.S. PATENT DOCUMENTS

| | | | |
|---|---|---|---|
| 8,018,183 B2 * | 9/2011 | Chen et al. .................... | 318/268 |
| 2005/0084384 A1 | 4/2005 | Delano et al. .................... | 417/42 |
| 2008/0018296 A1 * | 1/2008 | Hashimoto et al. ........... | 318/807 |

FOREIGN PATENT DOCUMENTS

| | | |
|---|---|---|
| DE | 295 16 268 U1 | 2/1996 |
| DE | 101 41 125 A | 6/2002 |
| DE | 10 2005 045 137 | 4/2007 |
| EP | 1 039 139 | 5/2004 |
| WO | WO 02-23298 A | 3/2002 |

OTHER PUBLICATIONS

Wikipedia, "PI Controller" http://en.wikipedia.org/wiki/PI_controller.

Free Dictionary, "PID Controller" http://encyclopedia.thefreedictionary.com.

* cited by examiner

FAN ARRANGEMENT

CROSS-REFERENCE

The present application is a section 371 of PCT/EP08/09701 filed 17 Nov. 2008, published 28 May 2009 as WO-2009-065539, claiming priority of German application DE 10 2007 057 099.8 filed 19 Nov. 2007, the disclosure of which is incorporated by reference.

FIELD OF THE INVENTION

The present invention relates to a fan arrangement having a fan driven by an electric motor.

BACKGROUND

When a fan is driven by an electric motor, what results is a combination of the properties of the fan and the properties of the electric motor.

A variety of fan designs exist, e.g. radial fans, transverse-flow blowers, axial fans, and diagonal fans. Radial fans are divided into radial fans having backward-curved blades, and radial fans having forward-curved blades. There are likewise further sub-types in the case of the other designs.

The properties of a fan result from the so-called fan characteristic curve, which indicates the quantity of air per hour ($m^3/h$) delivered by the fan at a particular static pressure, and from the motor characteristic curve, which indicates how much power the motor needs in order to deliver a specific quantity of air per hour.

The power requirement is further determined by the operating conditions of the fan. For example, when a fan is blowing air from outside into a room in which all the doors and windows are closed, the fan is operating at maximum static pressure. "Free outlet" blowing, conversely, means that the fan is located unrestrictedly in a space, and that no physical separation, and also no pressure difference, exists between its intake side and delivery side. This therefore means that a free outlet fan has a different power requirement than a fan that is delivering into a closed space.

An examination of the curve for a fan arrangement's power consumption plotted against generated volumetric air flow rate reveals that this power is highly dependent on the working point that is set, or on the pressure buildup in the fan. In the case of a radial fan, for example, maximum power is usually reached with free outlet, i.e. at a pressure elevation $\Delta pf=0$, whereas for an axial fan, it is reached at a maximum pressure elevation $\Delta pf=$maximum.

Radial fans are normally used at a higher static pressure. When they work without static pressure, i.e. in free-outlet fashion, they are being operated at their power limit, i.e. a radial fan must be designed for this operating point even though in practice it occurs seldom and in rather arbitrary fashion. This limits the power of such a fan under other operating conditions. Analogous considerations apply to other fan types.

SUMMARY OF THE INVENTION

It is an object of the invention to make available a novel fan arrangement.

This object is achieved by employing a controller which reduces any difference between operating electrical power $P_{IST}$ and desired electrical power $P_{SOLL}$ to thereby improve the air output characteristic curve.

Fan arrangements are normally designed so that the maximum permissible winding temperature of the electric motor is not exceeded at maximum electrical power consumption. This means that a fan arrangement of this kind is "under-stressed" for many applications, i.e. at most working points it is operating below its maximum permissible power level.

What is achieved, by means of the invention, is that a fan arrangement of this kind can be operated at its permissible power limit, i.e. an improved air output characteristic curve is obtained with the same fan. The approach in this context is to operate the fan arrangement always in the region of its maximum permissible power, i.e. at the power limit or close to it, and thereby to achieve a greater volumetric flow rate for the same counterpressure, i.e. to increase the air output without requiring a larger fan arrangement for that purpose. Different solutions may be produced in this context, depending on the type of fan arrangement.

BRIEF FIGURE DESCRIPTION

Further details and advantageous refinements of the invention are evident from the exemplifying embodiments, in no way to be understood as a limitation of the invention, that are described below and depicted in the drawings.

Figure 8:
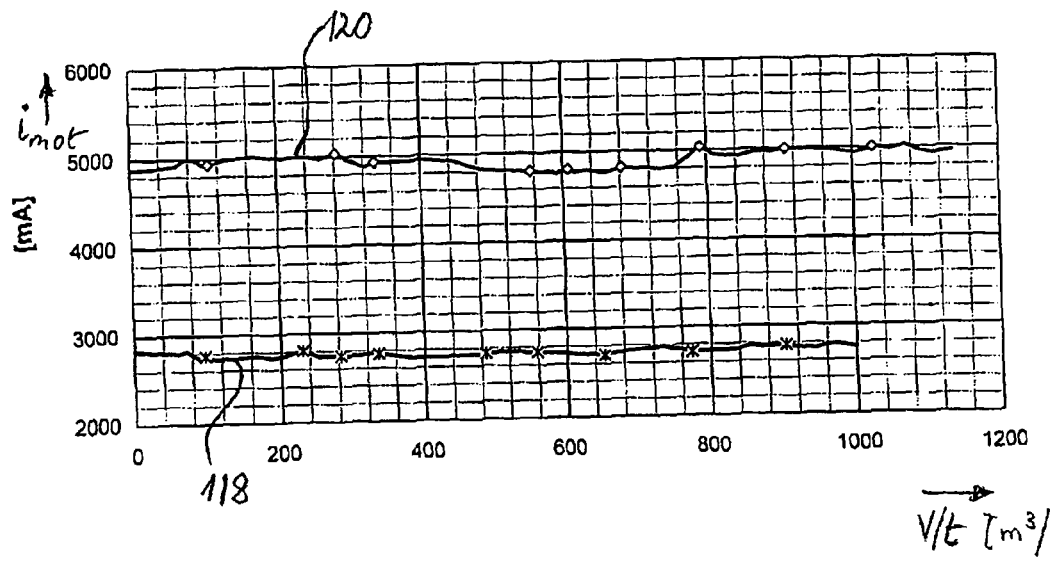
Figure 9:
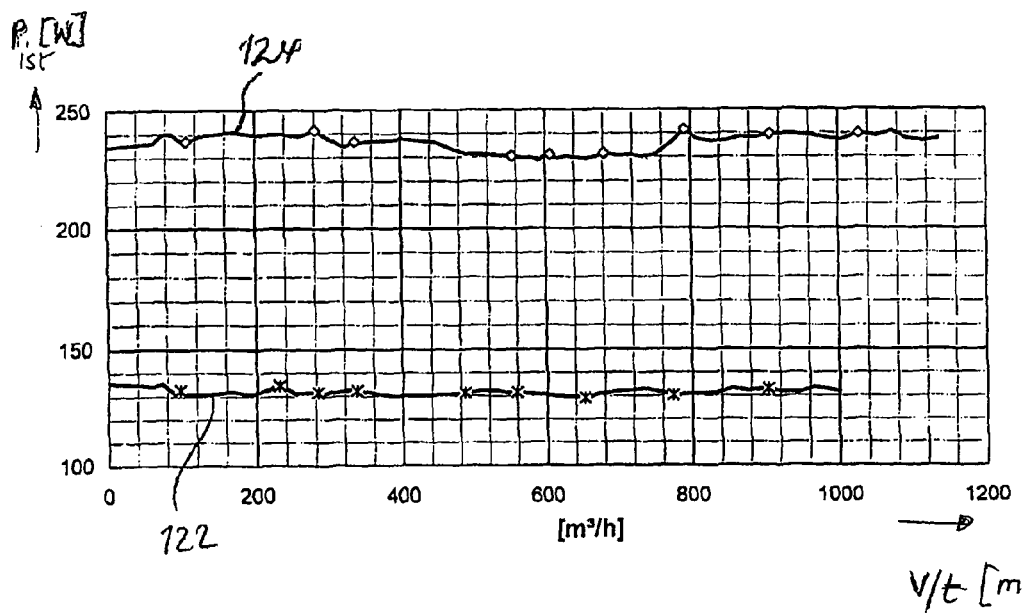

FIG. 8 shows motor current $i_{MOT}$ as a function of volumetric flow rate V/t at a constant low power and at a higher constant power; and FIG. 9 shows the electrical power P (watts) consumed by motor 12 at a low constant power (curve 122) and at a higher constant power (curve 124); it is evident that the power during operation is held practically constant, so that the motor's power can be fully utilized.

DETAILED DESCRIPTION

Figure 1:
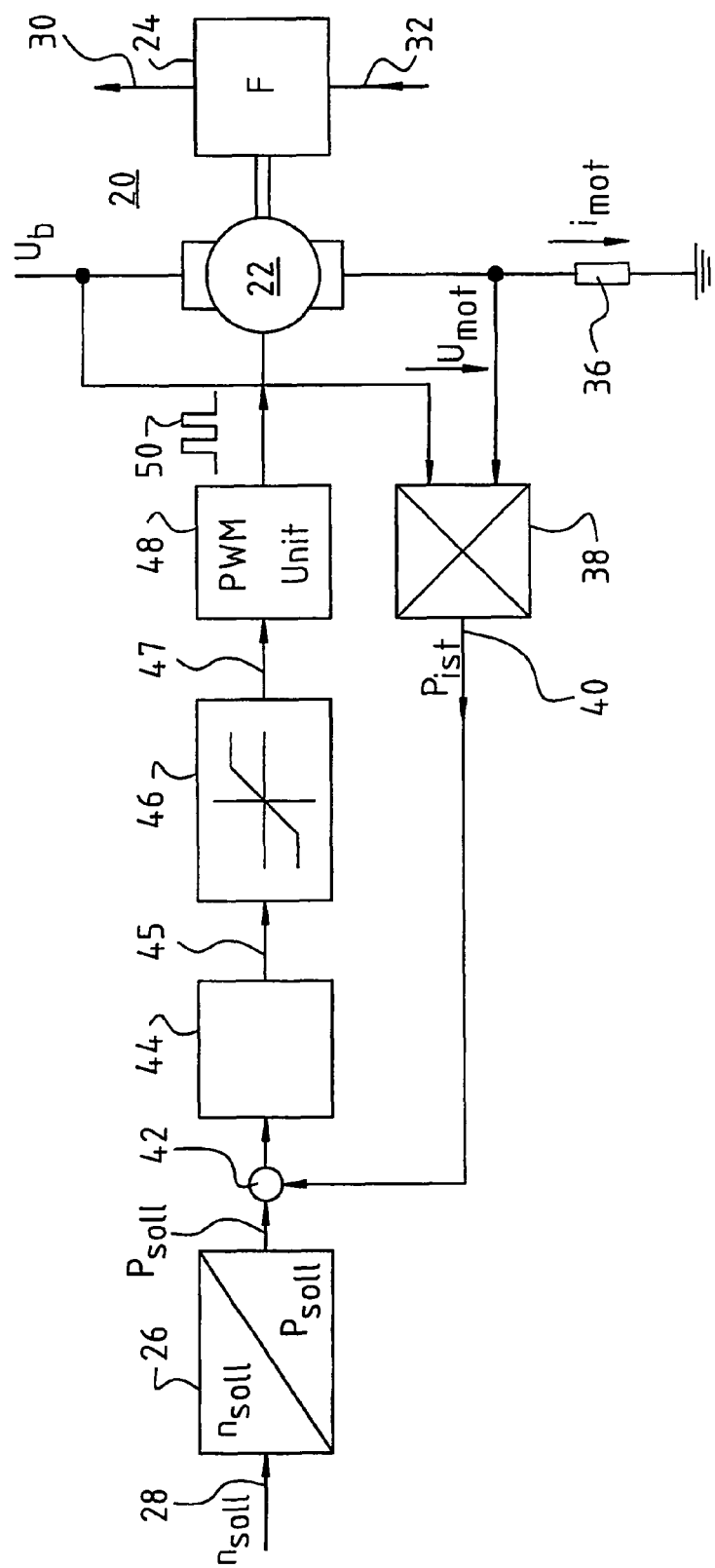
FIG. 1 shows an embodiment of an air output controller.

FIG. 1 shows a preferred embodiment of a fan arrangement 20 having an electric motor 22 and a fan 24 driven thereby, which fan arrangement 20 operates with power control. Fan arrangement 20 is continuously operated with power control in order to achieve an increase in air output in the context of fan 24, at least in portions of its fan characteristic curve, and thus to better utilize fan arrangement 20.

Fan arrangement 20 can be, for example, a usual equipment fan whose motor 22 will usually be a collectorless DC motor since, in the case of the latter, the rotation speed can be more easily modified than in the case of an AC or three-phase motor. The use of an AC or three-phase motor is, however, also not excluded.

The users of such fans are accustomed to fan arrangements that work with a rotation speed control system, and in which the rotation speed can be adjusted. For this reason, the desired rotation speed $n_{SOLL}$ specified by the user is delivered to input 28 of a target value converter 26, and converted there into a target power value $P_{SOLL}$. This conversion is based, for example, on the rotation speed n assumed by fan arrangement 20 when a predetermined electrical power P is delivered to motor 22, and fan 24 is blowing freely at its outlet 30, e.g. into a room having open windows and doors. The inlet of fan 24 is labeled 32, and in this case is unthrottled.

For example, if a rotation speed $n_{SOLL}$ of 1000 rpm is specified to target value converter 26, target power $P_{SOLL}$ is then modified until fan arrangement 20 is running (with free outlet) at 1000 rpm, e.g. at 2.3 watts. The value pair 1000 rpm=2.3 W is then inputted into converter 26. This is repeated for the entire value range that fan arrangement 20 can cover during operation, e.g. for 500, 600, 700, 1000, 2000 . . . rpm; interpolation between these values usually occurs.

Alternatively, it is also possible to determine a mathematical approximation formula with which the value for $n_{SOLL}$ can be converted directly into values for $P_{SOLL}$.

Because the values are measured while fan 24 is blowing freely at its outlet 30, the rotation speeds during actual operation are of course somewhat different from $n_{SOLL}$ but, in any case, the behavior obtained for fan arrangement 20 is similar to that of a speed-controlled fan.

Electrical power $P_{IST}$ consumed by motor 22 is ascertained, for example, by measuring voltage $u_{MOT}$ at motor 22 and motor current $i_{MOT}$ (e.g. at a measuring resistor 36). These values are delivered to a multiplier 38, at whose output 40 a value is obtained for electrical power $P_{IST}$ consumed by motor 22. This, along with value $P_{SOLL}$ from target value converter 26, is delivered to a comparator 42 whose output signal is delivered to a controller 44.

Depending on the speed and accuracy requirements, this latter can be, for example, a P controller, a PI controller, or a PID controller. Controller 44 has an output 45 at which a control input is obtained and is delivered to a limiter 46. The latter limits the control input to a predetermined value, which can be different depending on the rotation direction.

The limited signal at output 47 of limiter 46 is delivered to a PWM module 48 and transformed there into a PWM signal 50 that is delivered to motor 22 and controls current $i_{MOT}$ therein.

In order to prevent motor 22 from overloading, its power is therefore limited to a maximum value, e.g. by limiting current $i_{MOT}$.

Figure 2:
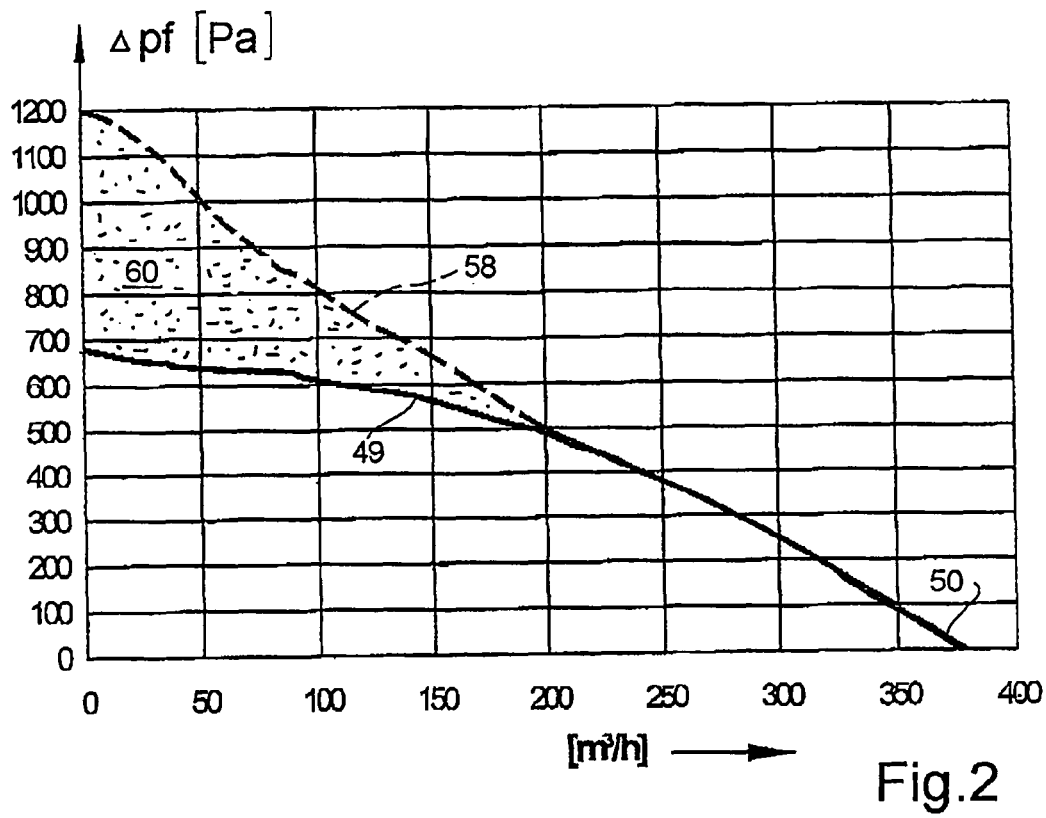
FIG. 2 shows the fan characteristic curve of a radial fan with and without the output controller of FIG. 1.
Figure 3:
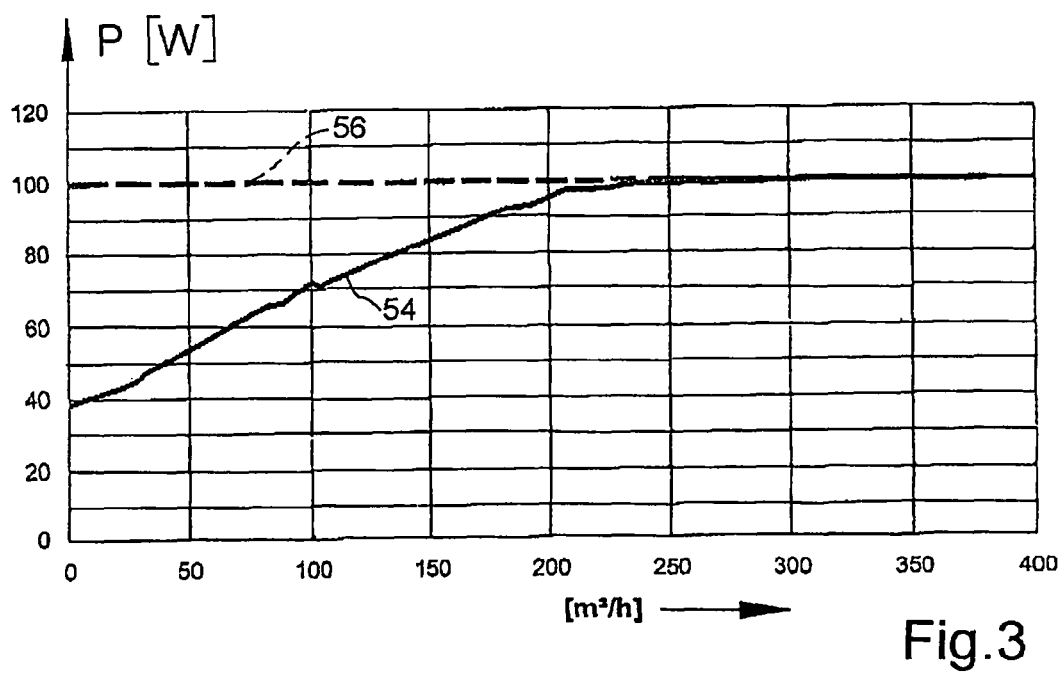
FIG. 3 depicts the fan power with and without an output controller.
Figure 4:
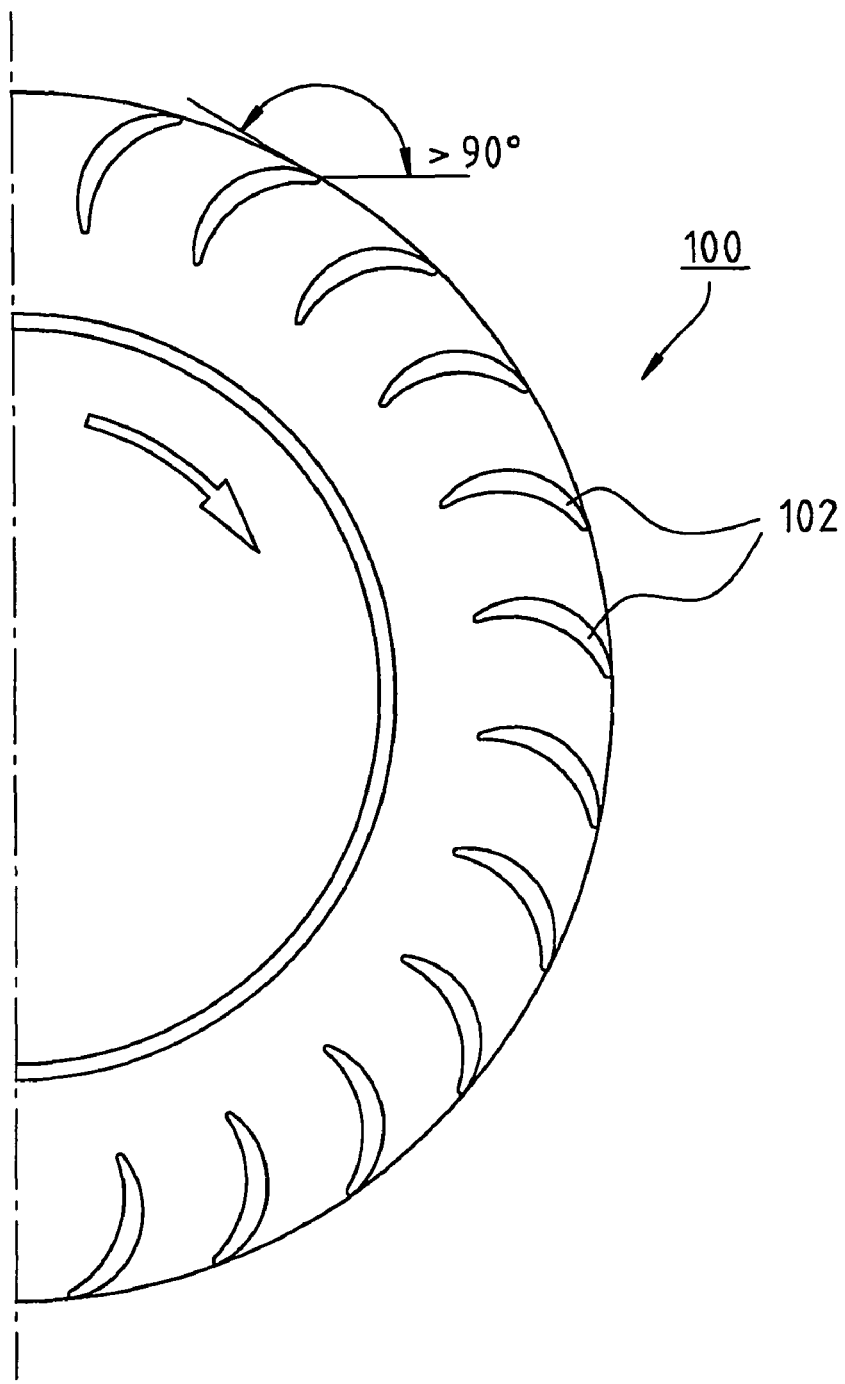
FIG. 4 is a partial depiction of a radial fan wheel 100 whose fan blades 102 are "forward-curved"

FIGS. 2 and 3 show, by way of example, the effect of the invention on a radial fan whose fan blades are forward-curved, i.e. curved in the rotation direction. Fan blades of this kind are depicted by way of example in FIG. 4.

Figure 5:
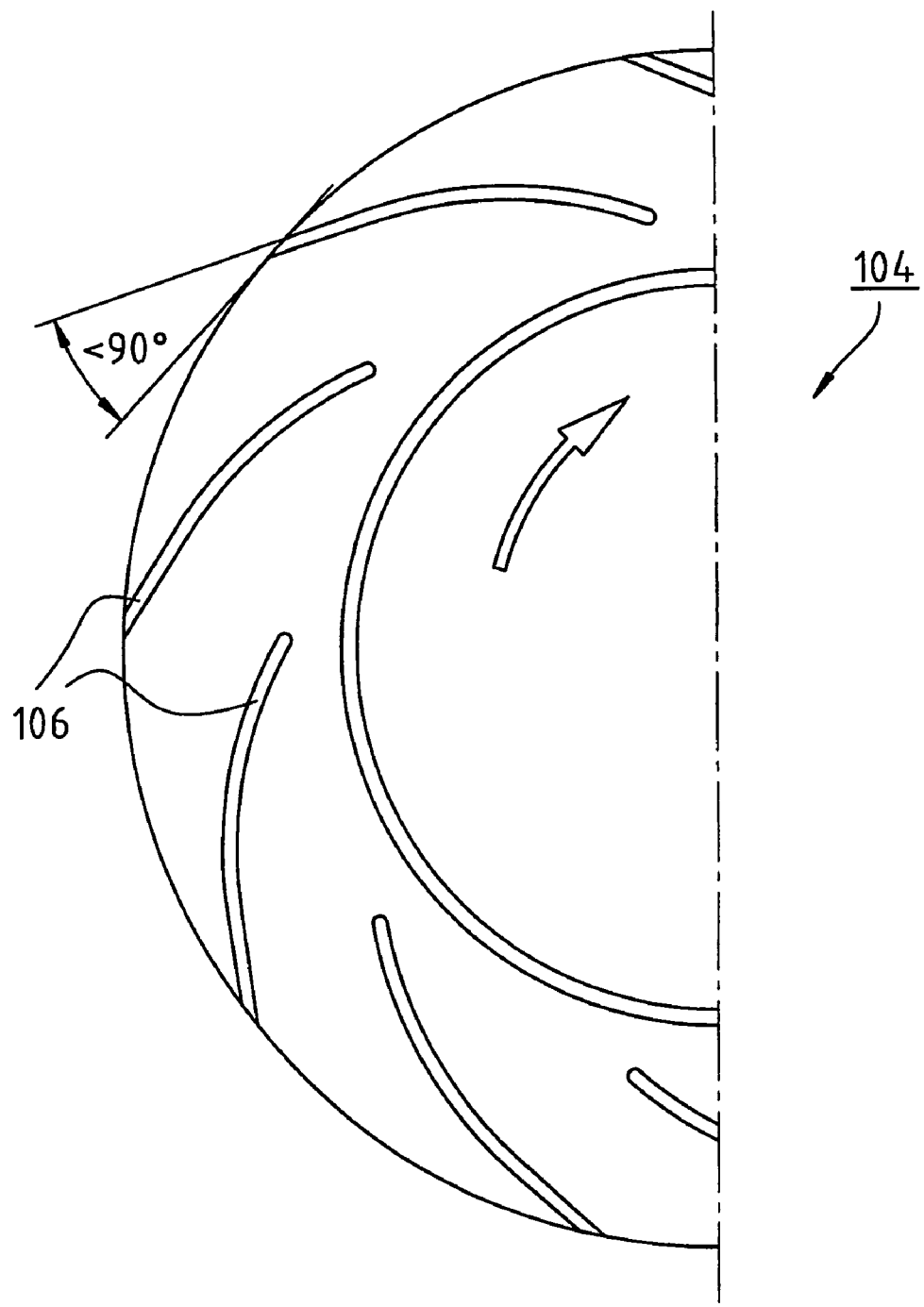
FIG. 5 depicts a radial fan wheel 104 whose fan blades 106 are "backward-curved"

FIG. 5 likewise shows a fan wheel whose fan blades are backward-curved and in which the invention can be used in the same fashion, although the curves that are obtained look somewhat different.

FIG. 2 shows, as an example, fan characteristic curve 49 without the invention, i.e. static pressure Δpf as a function of volumetric flow rate. For a radial fan, the maximum power is usually reached at a point 50 at which static pressure Δpf has a value of 0, i.e. at a point where fan 24 is blowing in free-outlet fashion, for example into a room having open windows and doors.

Moving from point 50 to the left, i.e. as the windows and doors are successively closed, the load on electric motor 22 decreases because static pressure Δpf increases. For curve 49 in FIG. 2, for example, at a static pressure of 700 Pa air is no longer being delivered, i.e. no further cooling is occurring, and the electrical power necessary for motor 22 decreases, as shown in FIG. 3) in the range from 200 to 0 m³/h, as shown by curve 54 of FIG. 3. Unutilized power reserves of fan arrangement 20 thus exist in this range.

Motor 22 is operated, for example, in a specific operating state with a target power value $P_{SOLL}$ of 100 W (see curve 56 of FIG. 3). When power $P_{IST}$ decreases here, as a result of the increasing static pressure, the rotation speed of fan 24 is increased, for example by raising the duty factor of PWM signal 50, until the desired power $P_{SOLL}$ is reached. This results, according to FIG. 2, in an improved fan characteristic curve 58, in which air is still delivered up to a static pressure of approximately 1200 Pa. The power reserves of fan 24 are made usable in this fashion, and the cooling of a device cooled by fan 24 is improved. These mobilized power reserves are labeled 60 in FIG. 2 and are highlighted in gray.

The description above refers to a radial fan. Application is likewise possible, however, for transverse-flow blowers, axial fans, diagonal fans, etc. The influence on the air output characteristic curve is more or less pronounced depending on the fan type.

A motor 22 is designed, as standard, approximately so that it reaches the maximum required power $P_{IST}$ when operating voltage Ub corresponds to the rated voltage, and so that, if voltage Ub becomes too high, the power delivered to motor 22 is limited.

This is done by way of a corresponding reduction in motor current $i_{MOT}$ (by modifying the duty factor of signal 50). The arrangement according to FIG. 1 thereby automatically adapts to different values of voltage Ub that may occur during operation, and the risk of overloading motor 22 is ruled out.

FIGS. 6 to 9 show measured values for the power control system according to FIG. 1, for an RER190 radial fan of the EBM-PAPST company and for two different power settings, namely a low power of approximately 135 W and a higher power of approximately 235 W.

Figure 6:
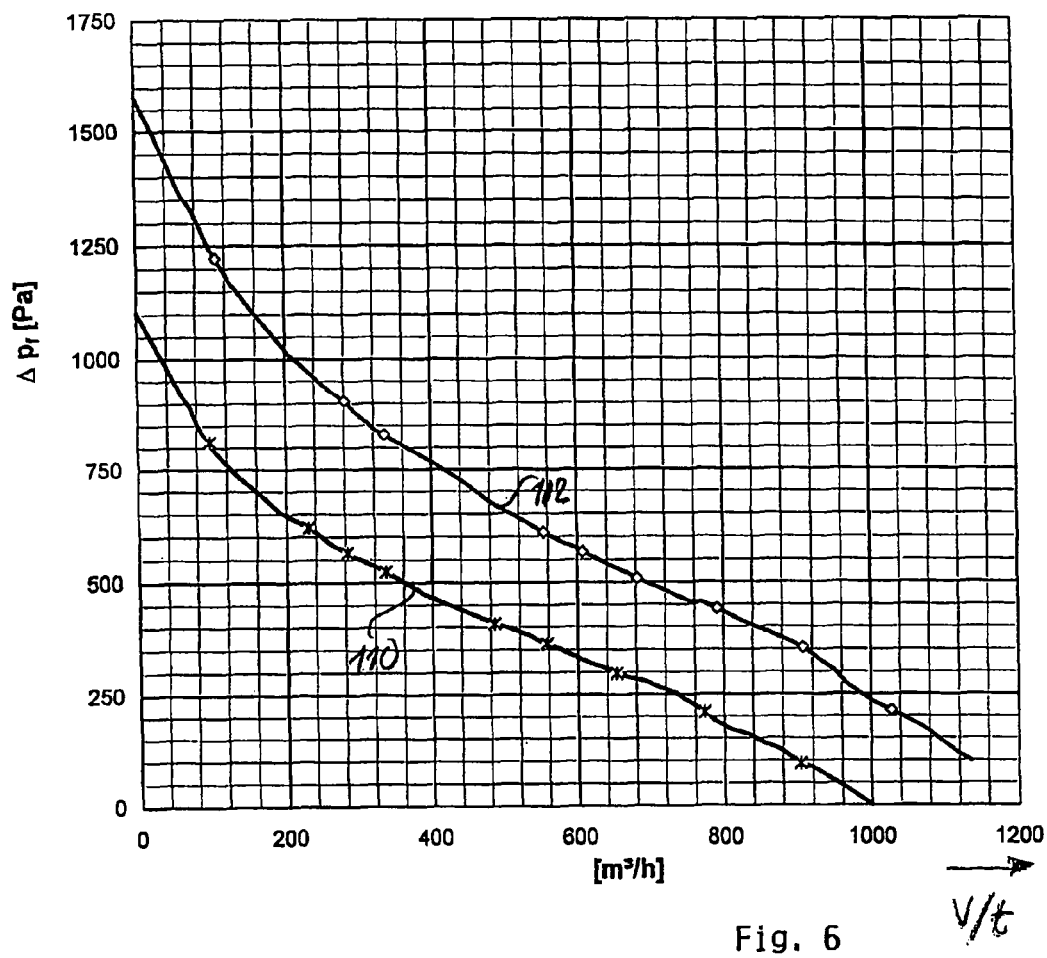
FIG. 6 shows measurement curves that were recorded using the motor according to FIG. 1; they show static pressure $\Delta pf$ as a function of volumetric flow rate V/t at a constant low power and at a constant higher power.

FIG. 6 shows static pressure Δpf as a function of volumetric flow rate. Curve 110 shows the result at a constant power that was regulated to 135 W, and curve 112 shows the result at a constant power of approximately 235 W. The curves run approximately parallel to one another. The volumetric flow rate was modified in the usual way by means of a measurement nozzle.

Figure 7:
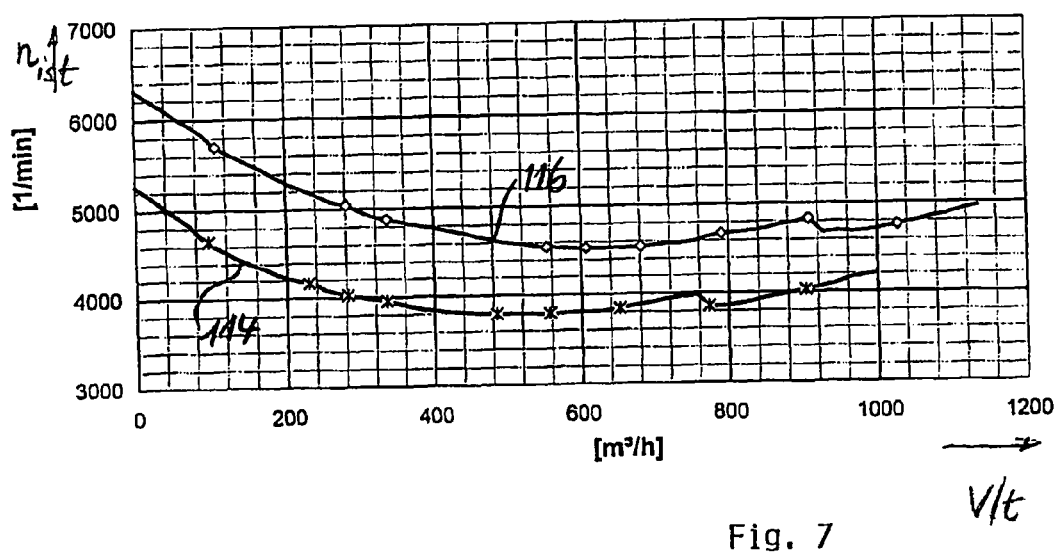
FIG. 7 shows measurement curves for FIG. 1; they show rotation speed as a function of volumetric flow rate at a low constant power and at a higher constant power.

FIG. 7 shows rotation speed $n_{IST}$ as a function of volumetric flow rate. The curve for 135 W is labeled 114, and the curve for 235 W is labeled 116. The volumetric flow rate was modified in the usual way by means of a measurement nozzle.

FIG. 8 shows motor current $i_{MOT}$ as a function of volumetric flow rate. Because DC voltage Ub (in this case 48 V) was held constant in FIG. 1, current $i_{MOT}$ is held constant by output controller 98. The curve for 135 W is labeled 118, the resulting current having been approximately 2.8 A; and the curve for 235 W is labeled 120, the current having been equal to about 5 A. Here as well, the volumetric flow was modified using a measurement nozzle (not depicted).

FIG. 9 shows electrical power $P_{IST}$ consumed by motor 22 as a function of volumetric flow. Curve 122 shows the result for a constant power of 135 W, and curve 124 shows the result for a constant power of 235 W. The volumetric flow rate was modified by means of a measurement nozzle (not depicted).

Many variants and modifications are of course possible in the context of the present invention.

What is claimed is:

1. A fan arrangement having a fan (24) driven by an electric motor (22), which fan arrangement (20) comprises:
   an apparatus for detecting the electrical power ($P_{IST}$) consumed by the electric motor (22) during operation;

an input apparatus (28) with a control input (45) for inputting a desired rotation speed ($n_{SOLL}$) of said electric motor;
a converter (26) for converting said desired rotation speed ($n_{SOLL}$) into a desired electrical power ($P_{SOLL}$);
a controller (44), which regulates said control input (45) controlling the electric motor (22) in such a way that the difference between the electrical power ($P_{IST}$) consumed in operation and the desired electrical power ($P_{SOLL}$) is reduced, in order thereby to improve the air output characteristic curve of the fan arrangement (20) at least in a portion of the overall operating range.

2. The fan arrangement according to claim 1, in which
the electrical power ($P_{IST}$) consumed by the electric motor (22) has at least one component that is calculated by multiplying a variable dependent on the measured motor current ($i_{MOT}$) by a variable dependent on the measured motor voltage ($u_{MOT}$).

3. The fan arrangement according to claim 1, in which
a PWM generator (48) is provided in order to generate the control signal (50) for the current ($i_{MOT}$) that is delivered to the electric motor (22) during operation.

4. The fan arrangement according to claim 3, in which
the PWM generator (48) is controlled by the output of the controller (44).

5. The fan arrangement according to claim 2, in which
a PWM generator (48) is provided in order to generate the control signal (50) for the current ($i_{MOT}$) that is delivered to the electric motor (22) during operation.

6. The fan arrangement according to claim 5, in which
the PWM generator (48) is controlled by the output of the controller (44).

\* \* \* \* \*